US006768082B2

(12) United States Patent
Aoyama et al.

(10) Patent No.: US 6,768,082 B2
(45) Date of Patent: Jul. 27, 2004

(54) PARTS WELDING DEVICE

(75) Inventors: Yoshitaka Aoyama, Sakai (JP); Shoji Aoyama, Sakai (JP)

(73) Assignee: Yoshitaka Aoyama, Osaka-Fu (JP)

( * ) Notice: Subject to any disclaimer, the term of this patent is extended or adjusted under 35 U.S.C. 154(b) by 0 days.

(21) Appl. No.: 10/326,183

(22) Filed: Dec. 19, 2002

(65) Prior Publication Data

US 2003/0189033 A1 Oct. 9, 2003

Related U.S. Application Data

(63) Continuation of application No. PCT/JP02/03419, filed on Apr. 5, 2002.

(51) Int. Cl.[7] ............................................... B23K 9/12
(52) U.S. Cl. ................................ 219/125.11; 228/29
(58) Field of Search ..................... 219/125.11, 125.1, 219/93, 98; 228/29

(56) References Cited

U.S. PATENT DOCUMENTS 2,930,883 A  *  3/1960  Adamec et al. ........ 219/125.11
3,501,612 A  *  3/1970  Denis .................... 219/125.11
5,359,171 A  * 10/1994  Aoyama ...................... 219/93
5,726,417 A  *  3/1998  Claussen et al. ....... 219/125.11

FOREIGN PATENT DOCUMENTS

| JP | 6-246446 | * 9/1994 |
| JP | 7-314133 | * 12/1995 |
| JP | 9-57458  | * 3/1997 |

* cited by examiner

Primary Examiner—Clifford C. Shaw
(74) Attorney, Agent, or Firm—J.C. Patents

(57) ABSTRACT

This invention relates to a device for welding a flange (3) of a part (1) having a shaft (2) and the flange (3) to a steel plate (44). The device comprises a supporting shaft (26), on the end of which a hole (37) for receiving the shaft (2) of the part (1) is formed, a supporting member (27) fitted on the axis of the supporting shaft (26) in a rotary manner, a supporting pipe (33) fitted into the supporting member (27) and having a electrode wire (36) inside, and driving mechanisms (40, 41, 42). In this device, the electrode wire (36) is directed so as to face the flange (3) of the part (1), whose shaft (2) has been received in the receiving hole (37). To achieve this arrangement, the head (34) of the tip of the supporting pipe (33) is positioned near the opening of the receiving hole (37) on the end of the supporting shaft (26), wherein the tip of the electrode wire (36) moves around the flange (3) as the supporting member (27) rotates.

14 Claims, 3 Drawing Sheets

PARTS WELDING DEVICE

CROSS-REFERENCE TO RELATED APPLICATION

This application is a continuation and claims the priority benefit of International Application No. PCT/JP02/03419, filed on Apr. 5, 2002; all disclosures are incorporated herein.

BACKGROUND OF THE INVENTION

1. Field of the Invention

This invention relates a parts welding device, wherein a part, such as a bolt, is held by a spring chuck mean and the part is welded to the other part, such as a steel plate.

2. Description of Related Art

As a method of welding a bolt where a flange is integrally formed on the shaft to a steel plate, stud welding is known. In this method, a collet-type chuck with a spring structure is arranged on the head of a feed pipe for the bolt and the shaft of the bolt moved to the chuck is held by the spring structure, wherein the flange is exposed on the head side. The flange is brought closer to the steel plate, and welding current is made to flow between the flange and the steel plate to generate arc, which fuses the flange and steel plate together by metal fusion. Then, pressure welding follows, completing the welding process.

The above method is to hold the bolt after stopping the approaching bolt by the collet-type chuck. This method, however, raises the problem that the holding position of the bolt is not determined in a constant manner. In such a situation, the gap between the flange and steel plate becomes not constant, causing the unevenness of welding quality. Further, for automating such a welding system, feeding and holding the bolt in a secure manner upon welding is imperative, but the above method cannot provide an operation enabling the feeding and holding to be made in a satisfactory manner. Besides, in the case of a nut with a flange integrally formed on the cylindrical part of the nut, on the internal surface of which a female screw is formed, a similar problem occurs when the flange is welded to the other part.

SUMMARY OF THE INVENTION

This invention is a parts welding device provided to solve the problem mentioned above. In the invented system, a part feed apparatus and a welding apparatus are mounted on a board, a supporting member is fitted on a supporting shaft fixed on the board in a rotary manner, a welding unit is fitted into the supporting member, and a receiving hole for a part fed by the part feed apparatus is formed on the head of the supporting shaft, wherein the head tip of the welding unit is arranged near the opening of the receiving hole.

The part fed by the part feed apparatus is inserted into the receiving hole and held there, and the part comes in contact with the other part, then both parts are welded together by the welding unit. The supporting shaft has the opening as the receiving hole for the part and the supporting member is fitted on the supporting shaft in a rotary manner, that is, the supporting member equipped with the welding unit is fitted on the supporting shaft in a rotary manner. Therefore, the operations, such as holding the part in the receiving hole and fitting or rotation of the welding unit, are arranged in a compact manner while the supporting shaft is set as the central member for the operations, providing a welding system having a constitutional advantage. In addition, when the part is fed to the receiving hole, the part is inserted in the hole from the outside, so that it can be held with the supporting shaft in a smooth manner.

It is applicable that the above supporting member is rotated by a rotation mean so that the head tip is moved to a prescribed position. As the supporting member rotates, the welding unit fitted into the supporting member rotates together, allowing the head tip to move freely to a required welding spot. Therefore, when a circular flange is welded to a steel plate, local welding spots can be arranged apart at 120 or 180 degree without fail.

While the above supporting shaft is arranged in the direction almost perpendicular to the board and the above part feed apparatus inserts the part retained on the feed rod of the feed unit into the above receiving hole from the head side of the above supporting shaft, a retaining mean for the part may be arranged in the above receiving hole. As described above, the part feeding behavior is to inserting the part into the receiving hole form the head side of the supporting shaft, wherein part holding can be made by the most simple method of inserting the part from the outside. As a result, the dislocation of the holding position of the part never occurs, making the relative position between the part and the other part constant, thus a good welding quality can be obtained. Further, arranging the part holding mean in the receiving hole keeps the relative position between the receiving hole and the part constant, maintaining a correct contact state upon making the part come in contact with the other part, thus works effectively to improve welding quality.

While the feed rod of the above part feed apparatus is made to move back and forth in an inclined state against the above supporting shaft, a moving-back-and-forth mean may be arranged for moving back and forth the whole body of the above feed rod in the same direction of the axis of the part retained on the feed rod. The part retained on the head of the inclined feed rod stops in the position where the axes of the part and receiving hole are aligned. Then, the whole body of the feed rod moved in the axial direction of the receiving hole and the part, allowing the shaft of the part to be inserted smoothly into the receiving hole. As described here, by arranging a proper position relation between the feed rod and supporting shaft and moving the whole body of the feed rod, the above smooth operation can be achieved, so that a high credibility as a welding system can be maintained. In order to secure the above coaxial state between the shaft and receiving hole, in this system, the axis of the supporting shaft, the axis of the shaft held by a supporting pipe, and the stroke direction of the piston rod of an air cylinder are all set in parallel. Thus, when the whole body of the feed rod is moved, the shaft is inserted smoothly in the receiving hole.

The above board can be fitted on the head of a robot apparatus. By operating the robot apparatus, the board is moved freely to any directions and the direction of the board upon its stopping can be selected freely, the parts welding can be made without any hamper even if the other part has a complicated form or the welding point is in a complicated area. In addition to such a free moves of the board, the particular arrangement made for the supporting shaft and feed rod gives more advantages to this welding system, further enhancing the utility of the system.

In another application, the above board is fixed to a stationary member and the other part to which the part is welded is held with the robot apparatus. Such a constitution is reverse to the one mentioned above, but secures the same advantages obtained by the one mentioned above. In the reversed constitution, the other part is held with the robot to move freely, while the part feed apparatus and the welding apparatus are kept stationary.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 4:
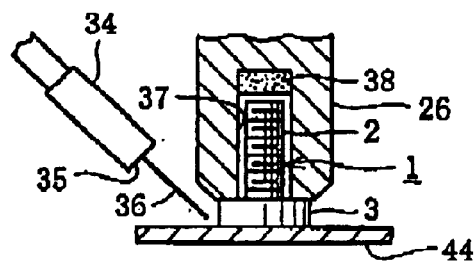
FIG. 4 is a vertical cross-sectional view describing the bolt welded to the steel plate.

The part as the object of this invention comprises an axial-shaped portion and a flange portion formed integrally with the axial portion. As a typical example, a bolt 1 as shown in FIG. 4 is cited. The bolt 1 comprises a shaft 2 on which a male screw is formed and a flange 3 formed integrally with the shaft 2, wherein the shaft 2 is inserted in a receiving hole described later and the flange 3 is welded to a steel plate, which is the other part for welding.

Figure 9:
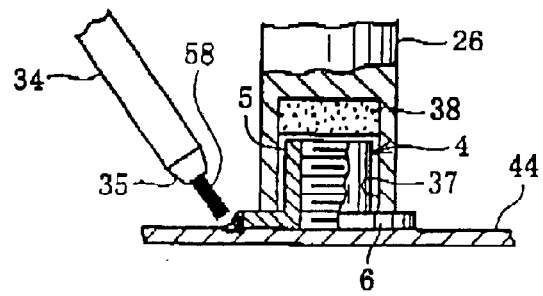
FIG. 9 is a vertical cross-sectional view similar to FIG. 4, showing a nut with flange welded to the steel plate.

As another part as the object, a nut 4 as shown in FIG. 9 is cited. The nut 4 comprises a cylindrical shaft 5 inside of which a female screw is formed and a flange 6 formed integrally with the shaft 5, wherein the shaft 5 is inserted in the receiving hole described later and the flange 6 is welded to the steel plate, which is the other part for welding. The following description will be made, focusing on the bolt 1.

Figure 1:
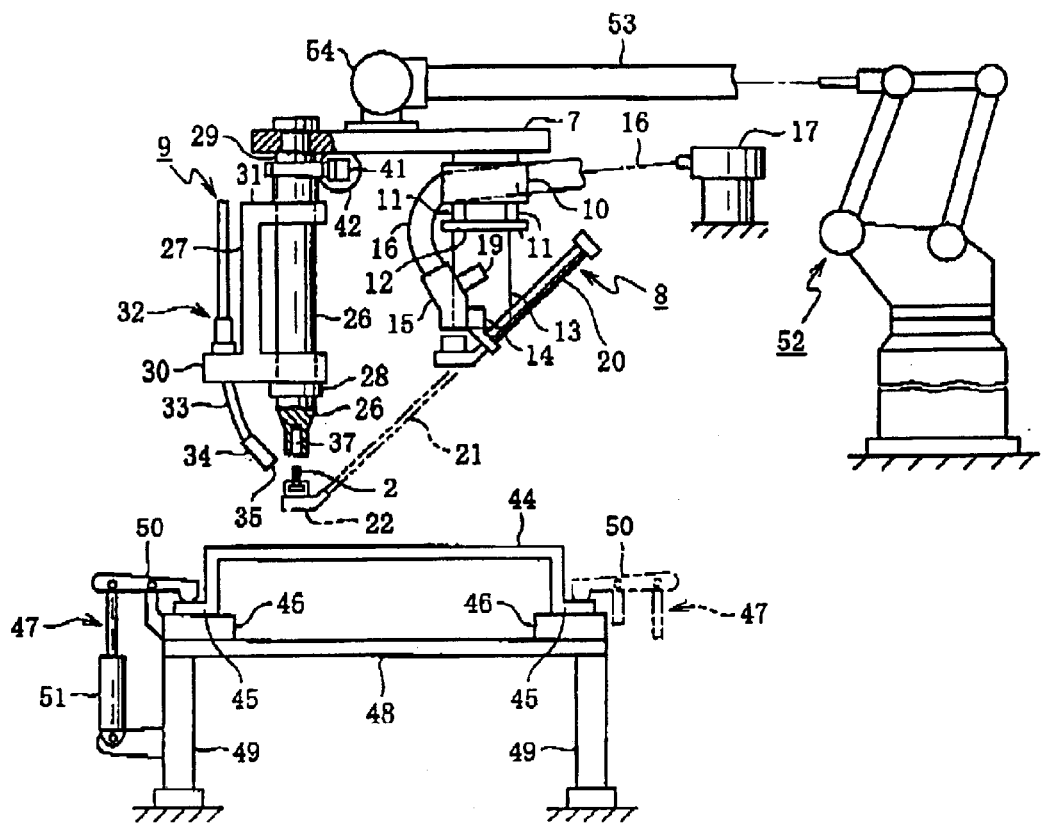
FIG. 1 is an elevation of the welding apparatus used in the embodiment of this invention.

FIG. 1 is the side elevation of the parts welding device as a whole, showing that a part feed apparatus 8 and a welding apparatus 9 are fixed on a board 7. Here, the part feed apparatus is described. An air cylinder 10 is fixed firmly to the board 7 and a coupling plate 12 is fixed to the piston rods 11 of the air cylinder 10, wherein a supporting plate 13 is fixed to the coupling plate 12. The coupling plate 12 is arranged in the position perpendicular to the stroke direction of the piston rods 1 and the supporting plate 13 is coupled vertically to the coupling plate 12. Therefore, the supporting plate 13 extends in the stroke direction of the piston rods 11, which is perpendicular to the board 7.

Figure 2:
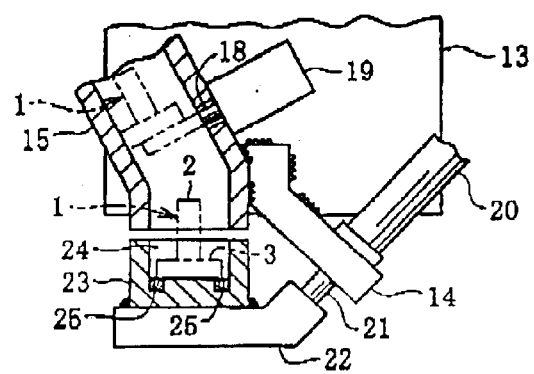
FIG. 2 is a partial cross-sectional view of the part feed apparatus for the apparatus shown in FIG. 1.

It is clear to understand by referring to FIG. 2 that a bracket 14 is welded to the supporting plate 13 in the direction orthogonal to the plane on which FIG. 2 is described. A part feed pipe 15 is welded to the bracket 14 and is connected to a synthetic-resin-made feed hose 16 connected to a parts feeder 17. A stopper strip 18 for temporarily stopping the bolt 1 is fitted on the part feed pipe 15, wherein the stopper strip operates by the back-and-forth move of the piston rod of an air cylinder 19 fixed to the part feed pipe 16.

An air cylinder 20 is fixed to the bracket 14 in an inclined manner and the piston rod 21 of the air cylinder 20 works as a feed rod 21, on the head of which a receiving plate 22 is fixed. A supporting pipe 23 is welded to the surface of the receiving plate, and has a housing hole 24 for the bolt 1 inside. In the bottom of the housing hole 24, magnets (permanent magnets) 25 are embedded for preventing the bolt 1 from being dislocated or coming off. As a replacement for such a magnet, other holding mean can be employed, such as attraction by air vacuum or cramping by a flat spring. The position graphically represented by continuous lines in FIG. 1 and FIG. 2 indicates the state that the feed rod 21 retreats to the limit, preparing for a bolt fed by the part feed pipe 15. In this state, when the stopper strip 18 retreats to allow the bolt 1 to move forward, the bolt 1 is attracted to the magnets 25 and is retained on the head of the feed rod 21.

Now a description is made for the welding apparatus 9. A variety of welding methods that can be employed here includes arc welding, gas welding (for example, by acetylene gas), laser welding, plasma welding, etc. In this embodiment, the arc welding method is employed for welding the bolt 1.

Figure 3:
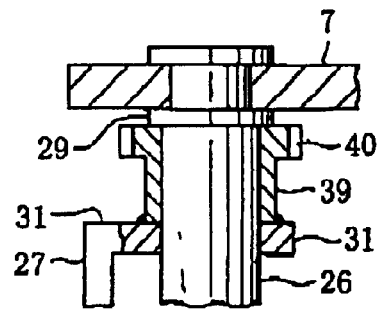
FIG. 3 is a cross-sectional view of the pinion of the welding apparatus shown in FIG. 1.

As shown in FIG. 1 and FIG. 3, a supporting shaft 26 is fixed firmly to the board 7 in the direction almost perpendicular to the board 7. A supporting member 27 is fitted into the supporting shaft 26 in a rotary manner, wherein the supporting shaft 26 penetrates the supporting member 27, making the supporting member 27 free to rotates. For preventing the supporting member 27 from moving in the axial direction of the supporting shaft 26, flanges 28, 29 for positioning are fixed to the supporting shaft 26. The supporting member 27 is almost U-shaped, having supporting strips 30, 31 formed on the lower and upper parts, respectively, through which the supporting shaft 26 penetrates.

An arc welding unit 32 is fitted into the supporting strip 30. The arc welding unit comprises a supporting pipe 33 and a head 34 fixed to the front end of the supporting pipe 33, the head 34 having its tip shown by a symbol 35. The supporting pipe 33 houses an electrode wire 36 so arranged that it is let out sequentially (FIG. 4). The constitution for providing shield gas is not illustrated.

On the head of the supporting shaft 26, a receiving hole 37 is formed in the axial direction of the supporting shaft 26, wherein the shaft 2 is inserted in the receiving hole 37 in which the holding mean for the bolt 1 is arranged. As the holding mean, a variety of means can be employed, such as of catching by a flat spring, of attractive holding by air vacuum, etc. In this case, a magnet 38 (permanent magnet) is placed on the bottom of the receiving hole 37. As shown in FIG. 4, when the flange 3 is abutted on the end face of the supporting shaft 26, a small gap is formed between the shaft 2 and the supporting shaft 26 to determine the exact relative position between the bolt 1 and the supporting shaft 26.

Figure 5:
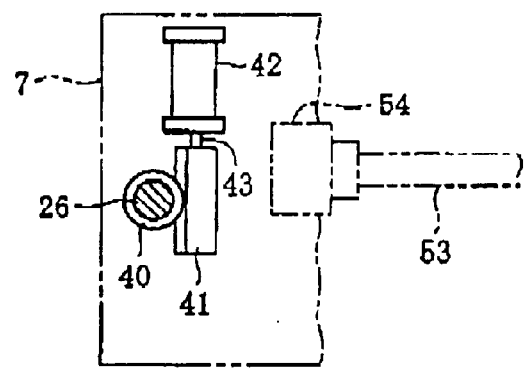
FIG. 5 is a simplified plan view describing a rack-pinion mechanism of the welding apparatus shown in FIG. 1.

The supporting member 27 can be swung on the supporting shaft 26. A usable rotation drive mean enabling this move varies, such as a mean of pushing back and forward an arm fixed to the supporting shaft 26. In this case, a rack-pinion mechanism is employed. As clearly shown in FIG. 3, a cylinder member 39, through which the supporting shaft 26 penetrates, is welded to the supporting strip 31, wherein a pinion 40 is formed on the cylinder member. The pinion 40 engages with a rack 41. As clearly shown in FIG. 5, an air cylinder 42 is fixed to the board 7 and the rack 41 is coupled to the piston rod 43 of the air cylinder 42. In FIG. 2, the teeth of the pinion and rack are not illustrated.

Illustration by two-dot chain lines in FIG. 1 represents the state that the feed rod 21 comes forward and stops at the spot where the shaft 2 and the receiving hole 37 are in the coaxial position. To achieve the coaxial position without fail, the axis of the supporting shaft 26 and of the shaft 2 held with the supporting cylinder 23, and the stroke direction of the piston rods 11 of the air cylinder 10 are set to be all in parallel.

Figure 6:
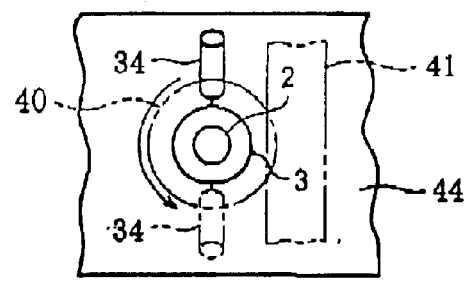
FIG. 6 is a simplified plan view of FIG. 4, showing the move of the head of the welding apparatus.

When the rack 41 moves back and forth by the air cylinder 42, the pinion 40 rotates, rotating the supporting member 27. As a result, a head 34 rotates 180 degree, as shown in FIG. 6.

A head tip 35 is set to be near the opening of the receiving hole 37. This arrangement represents the position requirement making it possible that the flange 3 is properly welded to the other part, a steel part 44, when the head 34 works to enable the welding as shown in FIG. 4. Since arc welding is implemented in this embodiment, the position requirement means the position relation between the head tip 35 and the opening of the receiving hole 37 when a proper length of an electrode wire 36 is projected from the head tip 35.

As shown in FIG. 1, the steel plate 44 has flanges 45 on the both ends, and the flanges are placed on supporting instruments 46 and are pressed to them with cramp mechanisms 47. The supporting instruments 46 are fixed on a supporting block 48 supported by supporting legs 49. The cramp mechanisms 47 are ordinary one, in which press arms 50 open and close by cylinders 51. The cramp mechanism on the right side in FIG. 1 is illustrated simply.

In this embodiment, the board 7 is joined onto a robot apparatus 52, which is of a commonly used 6-shaft-type. The robot apparatus has an arm 53, on the head of which a joint drive unit 54 is provided and is joined to the board 7.

The operation in the above embodiment is described. The feed rod 21 moves forward by the air cylinder 20, and the bolt 1 retained on the head of the feed rod comes to stop in the position illustrates by two-dot chain lines in FIG. 1. Then, the air cylinder 10 moves the whole body of feed rod 21, making the shaft 2 come into the receiving hole 37, where the shaft 2 is attracted to the magnet 38. Next, the air cylinder moves backward, while the bolt 1 stays in the receiving hole 37, returning the feed rod 21 to the position illustrated by continuous lines in FIG. 1. The robot apparatus 52 operates to move the whole body of welding apparatus 9, pressing the flange 3 of the bolt to the steel plate 44. At this point, the welding unit 32 operates, and the flange 3 is welded to the steel plate 44 as the electrode wire 36 from the head 34 fuses.

When one spot has been welded, the rack-pinion mechanism operates, rotating the supporting member 27 by 180 degree so that it stops at the next spot where another welding is carried out.

In order to make the bolt remain in the receiving hole, as described above, it is so arranged that the attraction force of the magnet 38 is stronger than that of the magnet 25. The supporting shaft 26 and the part feed apparatus 8 are arranged in the same longitudinal direction, so that the bolt 1 can be fed into the receiving hole 37 of the supporting shaft as the feed rod 21 is moved forward.

Figure 7:
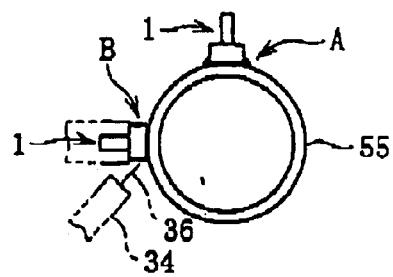
FIG. 7 is a simplified side view showing the case of welding the bolt to the steel plate.

In the case shown in FIG. 1, the steel plate 44 is flat shaped. On the other hand, in the case shown in FIG. 7, a steel pipe 55 having a circular section is described. Though unillustrated, both the ends of the steel pipe 55 are held with rotary chucks in such a way that the steel pipe can be rotated clockwise or counterclockwise. While the steel pipe 55 is kept still, the bolt is welded to A spot, and to B spot in turn. For such a welding operation, the robot apparatus 52 shifts sequentially the welding spots.

Figure 8:
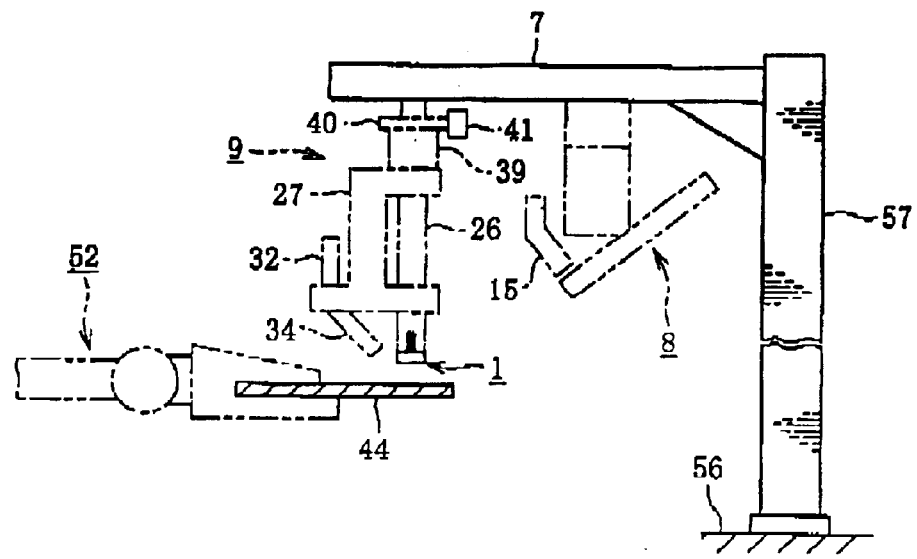
FIG. 8 is a simplified view showing the welding apparatus used in the other embodiment in the invention.

In the embodiment shown in FIG. 8, the board 7 is kept still and the steel plate 44 is held with the robot apparatus 52. The part feed apparatus 8 and the welding apparatus 9 are mounted on the board 7, which is made stationary via a supporting pillar 57 erected on a floor 56. The robot apparatus 52 attaches the steel plate 44 closely to the bolt 1 held with the supporting shaft 26, preparing the state showing in FIG. 4, where welding is carried out.

In the case of the flanged nut 4 shown in FIG. 9, the end of the flange 6 is welded to the steel plate 44 by gas welding. While mixed gas, which is combustion gas, consisting of acetylene and oxygen is made to flow out from the head 34, a flame 58 is blown on the welding point.

Though the air cylinders used in the above embodiments have hoses for operational air, which are supposed to be illustrated, the illustration is omitted in the drawings. Sequence control enabling the above operations can be easily implemented by using electromagnetic air control valves and control circuits, which are in common use, in combination.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A parts welding device, comprising:
   a part feed apparatus and a welding apparatus, mounted on a movable board;
   a supporting member, rotably fitted into a supporting shaft that is fixed to the board;
   a welding unit, mounted to the supporting member; and
   a receiving hole for a part fed by the part feed apparatus, formed on a front end of the supporting shaft,
   wherein a tip of the head of the welding unit is arranged near an opening of the receiving hole.

2. The parts welding device as claimed in claim 1, further comprising a driving means for rotating said supporting member.

3. The parts welding device as claimed in claim 1, wherein said supporting shaft is arranged in the direction almost perpendicular to a the movable board, said part feed apparatus is arranged in such a way that a part held with a feed rod of the part feed apparatus is inserted in said receiving hole from the head side of said supporting shaft, and a holding means for the part is arranged in said receiving hole.

4. The parts welding device as claimed in claim 1, further comprising a driving means for moving back and forth the whole body of a feed rod in the same direction of the axis of a part retained on said feed rod, wherein the feed rod of said part feed apparatus is arranged in such a way that said feed rod moves back and forth in the direction inclined against said supporting shaft.

5. The parts welding device as claimed in claim 1, wherein said board is joined to the head of a robot apparatus.

6. The parts welding device as claimed in claim 1, wherein said board is fixed to a stationary member and the other part to which a part is welded is held with the robot apparatus.

7. The parts welding device as claimed in claim 1, wherein a position of the tip of the head is changed by just rotating the supporting member.

8. A parts welding device for welding a flange of a part having a shaft and the flange to the other part, and comprising a welding unit, the parts welding device comprising:

a supporting shaft, wherein a receiving hole is formed on an end of the supporting shaft for receiving the shaft of the part;

a supporting member, fitted on an axis of the supporting shaft in a rotary manner;

a supporting pipe, fitted to the supporting member and an electrode wire penetrating internally the supporting pipe; and a driving mechanism for rotating the supporting member, wherein a head of a front end of the supporting pipe is located near an opening of the receiving hole of the supporting shaft, and said wire is directed to the flange of the part whose shaft has been virtually received in said receiving hole;

wherein a position of the front end of the supporting pipe is changed by just rotating the supporting member.

9. The parts welding device as claimed in claim 8, further comprising a part feed apparatus, which comprises a part feed pipe having an opening from which a part fed by a parts feeder comes out, a feed rod movable to back and forth and having a holding portion on its head, the holding portion having a housing hole for holding the part in the state that the shaft of the part faces upward, a drive mean for moving back and forth the feed rod between the first position, where the housing hole of the holding portion comes to be coaxial with the exit of the part feed pipe, and the second position, where the housing hole of the holding portion comes to be coaxial with the receiving hole of the supporting shaft, and a second drive mean for moving the feed rod in the axial direction of the supporting shaft.

10. The parts welding device as claimed in claim 9, wherein said welding unit and said part feed apparatus are mounted on a common board.

11. The parts welding device as claimed in claim 10, wherein said board is fixed to a stationary member and the other part to which a part is welded is held with the arm tip of the robot apparatus.

12. The parts welding device as claimed in claim 9, wherein said board is joined to an arm tip of a robot apparatus.

13. The parts welding device as claimed in claim 9, wherein said supporting shaft extends virtually in a vertical direction against the board, and a back-and-forth axis of said feed rod extends in an incline direction against said supporting shaft.

14. The parts welding device as claimed in claim 9, wherein said part feed apparatus is arranged in a way that the shaft of the part held with the part feed rod is inserted in said receiving hole from the head side of said supporting shaft, and said receiving hole has a holding mean for the part.

\* \* \* \* \*